Patented Dec. 6, 1949

2,490,098

UNITED STATES PATENT OFFICE 2,490,098

FLUOROPIPERIDINE COMPOUNDS

Joseph H. Simons, State College, Pa., assignor to Minnesota Mining & Manufacturing Company, St. Paul, Minn., a corporation of Delaware No Drawing. Application July 14, 1948
Serial No. 38,751

2 Claims. (Cl. 260—293)

This application relates to the discovery of a new and useful class of synthetic cyclic carbon compounds which contain only nitrogen and fluorine in addition to carbon.

More specifically, this application relates to the discovery of undecafluoropiperidine, $C_5F_{10}NF$, a cyclic compound having a single nitrogen atom in the ring, which nitrogen atom is bonded to two carbon atoms of the ring and also to a fluorine atom. The structural formula is:

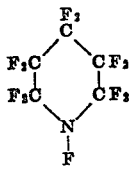

This compound is liquid at room temperature and has a boiling point of about 48° C.

This compound corresponds to piperidine, $C_5H_{10}NH$, the hydrogen atoms thereof being entirely replaced by fluorine atoms. The present compound has a much lower boiling point, since the boiling point of piperidine is 106° C.; despite the fact that its molecular weight is 283, whereas that of piperidine is 85. Piperidine is a secondary amine and may be regarded as derived from ammonia, $NH_3$. The present compound is not an amine and should be regarded as derived from $NF_3$ rather than from $NH_3$.

The present invention also includes higher-boiling homologous compounds wherein a saturated fluorocarbon side group or chain, having the formula $—C_nF_{2n+1}$, is bonded to a carbon atom of the ring, replacing a fluorine atom. These correspond to the C-alkyl piperidine compounds, the hydrogen atoms being replaced by fluorine atoms. Examples of such homologous compounds are: $CF_3C_5F_9NF$, tridecafluoromethyl piperidine (or tridecafluoropipecoline), corresponding to methyl piperidine (or pipecoline); $C_2F_5C_5F_9NF$, pentadecafluoroethyl piperidine, corresponding to ethyl piperidine; $C_3F_7C_5F_9NF$, heptadecafluoropropyl piperidine, corresponding to propyl piperidine; $C_4F_9C_5F_9NF$, nonadecafluorobutyl piperidine, corresponding to butyl piperidine; $C_5F_{11}C_5F_9NF$, heneicosafluoroamyl piperidine, corresponding to amyl piperidine; and $C_6F_{13}C_5F_9NF$, tricosafluorohexyl piperidine, corresponding to hexyl piperidine.

The members of this homologous series (including the first member) may be represented by the generic formula:

$$C_nF_{2n+1}C_5F_9NF$$

where $n$ is zero or an integer.

The compounds of this invention have physical properties resembling those of the saturated fluorocarbons (carbon fluorides). They have a high degree of thermal stability, exceptionally low boiling points relative to molecular weight, low refractive indices, low dielectric constants, low viscosities and low surface tensions. They may be employed as solvents, hydraulic mechanism fluids and dielectrics. Unlike the fluorocarbons (wherein the fluorine atoms are all bonded to carbon atoms), the present compounds contain a nitrogen-bonded fluorine atom in the molecule in consequence of which the molecule is reactive. They are able to enter into various chemical reactions so as to have value as chemical intermediates in the production of other compounds, the N-bonded fluorine atom being replaceable by other atoms and radicals.

The electrochemical process broadly described and claimed in my copending application, Ser. No. 677,407, filed June 17, 1946, (since abandoned in favor of Ser. No. 62,496, filed Nov. 29, 1948), may be employed in preparing compounds of this invention. Briefly, this process involves electrolyzing in liquid hydrogen fluoride a corresponding hydrogen-containing starting compound, having the same (or a similar) skeleton structure as that of the desired product compound. Thus piperidine, $C_5H_{10}NH$, can be used as the starting compound for making undecafluoropiperidine, $C_5F_{10}NF$. Also, it is possible to use the corresponding aromatic hydrogen-containing compound as the starting compound, in which case the process causes fluorine addition as well as hydrogen replacement to produce the saturated product compound. Thus pyridine, $C_5H_5N$, can also be used as the starting compound for making $C_5F_{10}NF$, as illustrated in the subsequent example.

The electrochemical process also produces a saturated aliphatic fluorocarbon compound having the same number of carbon atoms as the starting compound, resulting from breaking of the N-C bonds. Thus dodecafluoropentane, $C_5F_{12}$, as well as $C_5F_{10}NF$ is produced by electrolyzing piperidine or pyridine. There are also produced various fluorocarbon fragmentation products containing fewer carbon atoms than the starting compound. $NF_3$ is formed. Separation can be effected by fractional distillation.

A simple type of electrolytic cell can be used, employing a nickel anode and an iron or steel cathode, for example. An iron or steel container can be used, which may be employed as a cathode, with a cover of iron or steel which is bolted in place. Anode and cathode plates, in alternating array, can be suspended from the cover. A suitable gasket material, and insulating material for electrode mountings and leads, is "Teflon," (polytetrafluoroethylene). An upper outlet for gaseous products, an upper inlet for charging materials, and a bottom outlet for liquid products, may be provided. The cell may be provided with a cooling jacket for maintaining a desired operating temperature.

Commercial anhydrous liquid hydrogen fluoride can be used. This normally contains a trace of water, but water need not be present and highly anhydrous hydrogen fluoride can be used. The starting compounds are solube in the liquid hydrogen fluoride and provide adequate electrolytic conductivity.

A cell potential of about 4 to 8 volts has been found suitable. A current density of 20 or more amperes per square foot of anode surface can readily be obtained. Voltages sufficiently high to result in the formation of free fluorine are avoided. The process does not depend upon the generation of free fluorine and the latter, if produced, would result in explosions, electrode corrosion, and undesirable reactions.

A preferred operating pressure is atmospheric pressure and a preferred operating temperature is about 0° C.; but higher and lower operating pressures and temperatures can be employed.

The non-gaseous product compounds separate as a constituent of a liquid which is immiscible with the electrolyte and settles to the bottom of the cell from which it can be withdrawn. The constituent compounds can be separated by fractional distillation.

*Example*

This example illustrates the production of $C_5F_{10}NF$, undecafluoropiperidine, using pyridine as the starting compound in the previously mentioned type of electrochemical process.

Use was made of an iron laboratory cell containing a set of nickel anodes and iron cathodes, operating at atmospheric pressure and a temperature of 0° C. The initial cell charge consisted of about 7,500 grams of highly anhydrous liquid hydrogen fluoride and 700 grams of pyridine. Additional pyridine was added during the run to make a total of about 2000 grams. The pyridine employed was dried over solid sodium hydroxide and then distilled. Direct current was passed for a run period of four days, at an average voltage of approximately 6.0. A total of 447 faradays was passed.

The liquid cell product mixture was treated with lime to remove hydrogen fluoride and was fractionally distilled. There was obtained about 250 grams of a liquid fraction which was identified as relatively pure $C_5F_{10}NF$, undecafluoropiperidine, having the following measured properties:

| | |
|---|---|
| Boiling point °C | 48 |
| Refractive index (at 20° C.) | 1.281 |
| Density (grams/c. c. at 20° C.) | 1.744 |
| Surface tension (dynes/cm. at 20° C.) | 13.6 |
| Molecular weight (from vapor density) | 285 |
| Per cent F | 73.4 |
| Per cent N | 4.87 |

The values for the pure compound as calculated from the formula are: molecular weight, 283; per cent F, 73.1; per cent N, 4.95.

The boiling point is substantially higher than that of the $C_5F_{12}$ product (29° C.) and this facilitates making a clean-cut separation. This material crystallizes readily when chilled by solid —$CO_2$, which further confirms the symmetrical cyclic structure.

What I claim is as follows:

1. The new and useful cyclic compound undecafluoropiperidine, $C_5F_{10}NF$, a liquid compound having a boiling point of about 48° C.

2. The new and useful cyclic compounds of the class consisting of undecafluoropiperidine and of fluoroalkylpiperidines which have the formula:

$$C_nF_{2n+1}C_5F_9NF$$

where $n$ is an integer.

JOSEPH H. SIMONS.

REFERENCES CITED

The following references are of record in the file of this patent:

McBee et al.: Industry and Engineering Chemistry, vol. 39 (1947), pp. 389–392.